United States Patent [19]
Motz

[11] 3,717,019
[45] Feb. 20, 1973

[54] ROLLING OF GEAR LOCKS

[75] Inventor: Carl H. Motz, Harper Woods, Mich.

[73] Assignee: Lear Siegler, Inc., Santa Monica, Calif.

[22] Filed: Feb. 25, 1971

[21] Appl. No.: 118,696

[52] U.S. Cl. ..................72/102, 72/108, 29/159.2
[51] Int. Cl. ...............................................B21h 5/00
[58] Field of Search ..72/102, 108; 29/159.2; 74/325, 74/460 R; 287/52.05

[56] References Cited

UNITED STATES PATENTS

| | | |
|---|---|---|
| 2,440,775 | 5/1948 | Land ..........................74/325 |
| 2,079,513 | 5/1937 | Lapsley ....................29/159.2 |
| 1,935,965 | 11/1933 | Wahlberg ..................29/159.2 |
| 3,590,619 | 7/1971 | Sheldon et al. ............72/102 |
| 2,595,209 | 4/1952 | Burkhalter ...............287/52.05 |

Primary Examiner—Lowell A. Larson
Attorney—Whittemore, Hulbert & Belknap

[57] ABSTRACT

A method of forming a gear lock construction in clutch gear teeth which comprises rolling the clutch gear in tight mesh with a gear-like rolling die to form recesses or recessed areas in the teeth of the gear which provide shoulders extending generally between the roots and crests of the teeth.

11 Claims, 19 Drawing Figures

PATENTED FEB 20 1973
3,717,019
SHEET 1 OF 2
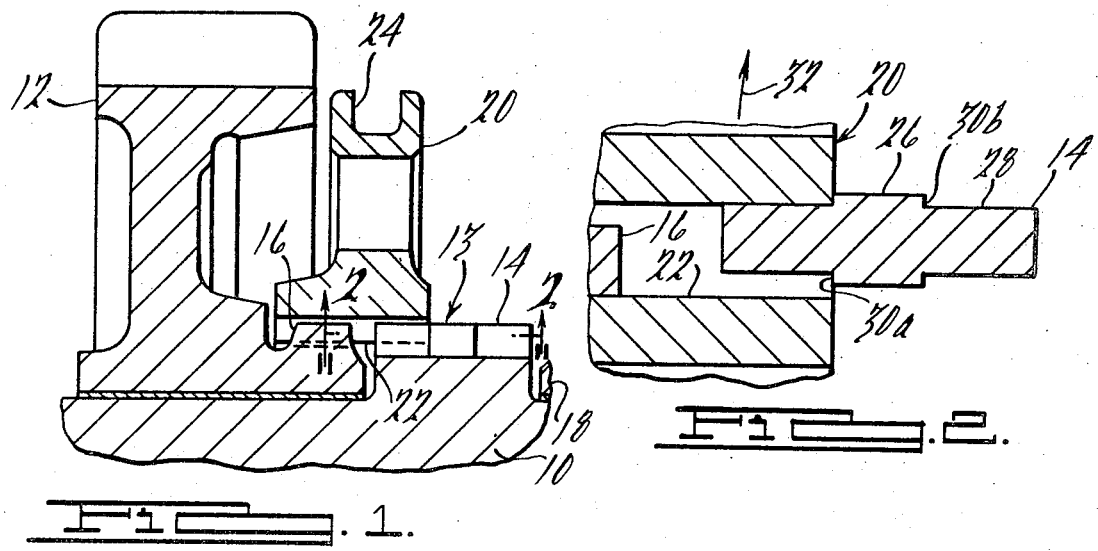
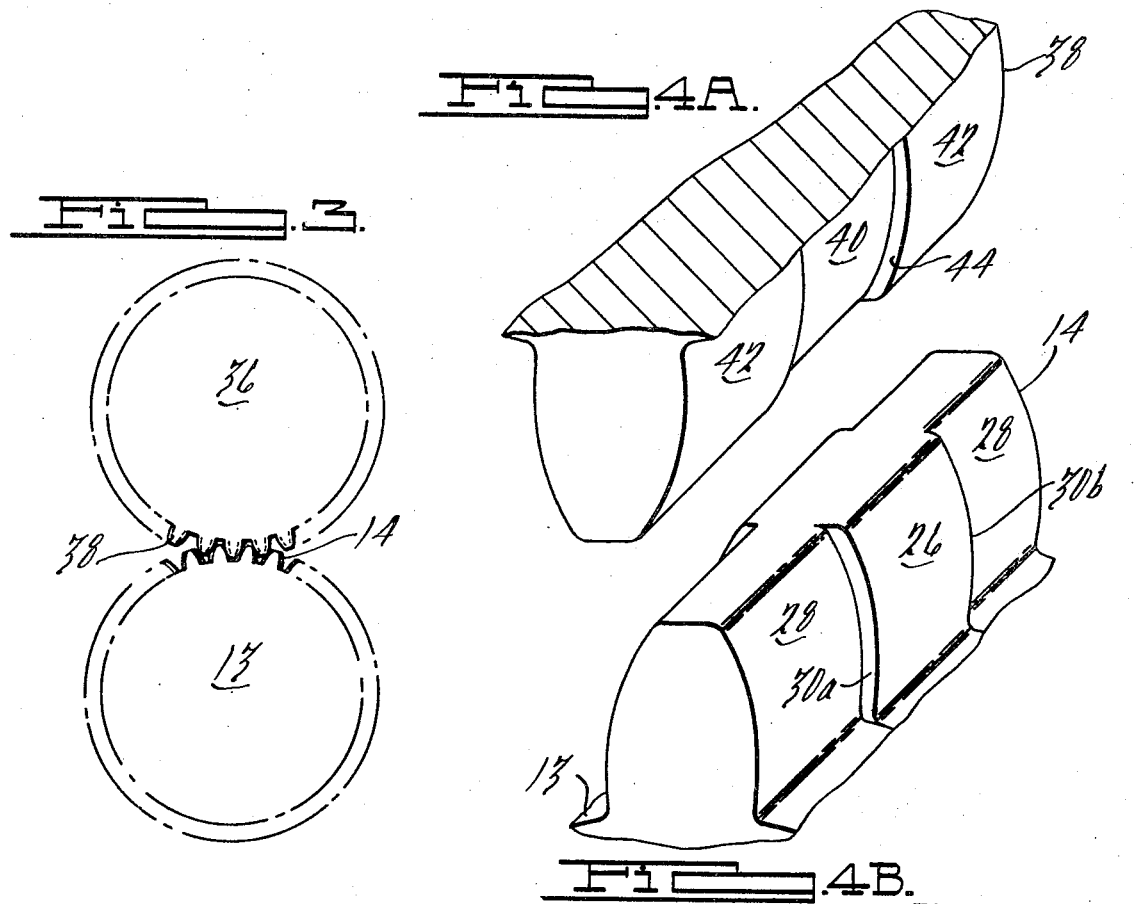
INVENTOR.
Carl H. Motz.
BY Whittemore,
Hulbert & Belknap
ATTORNEYS

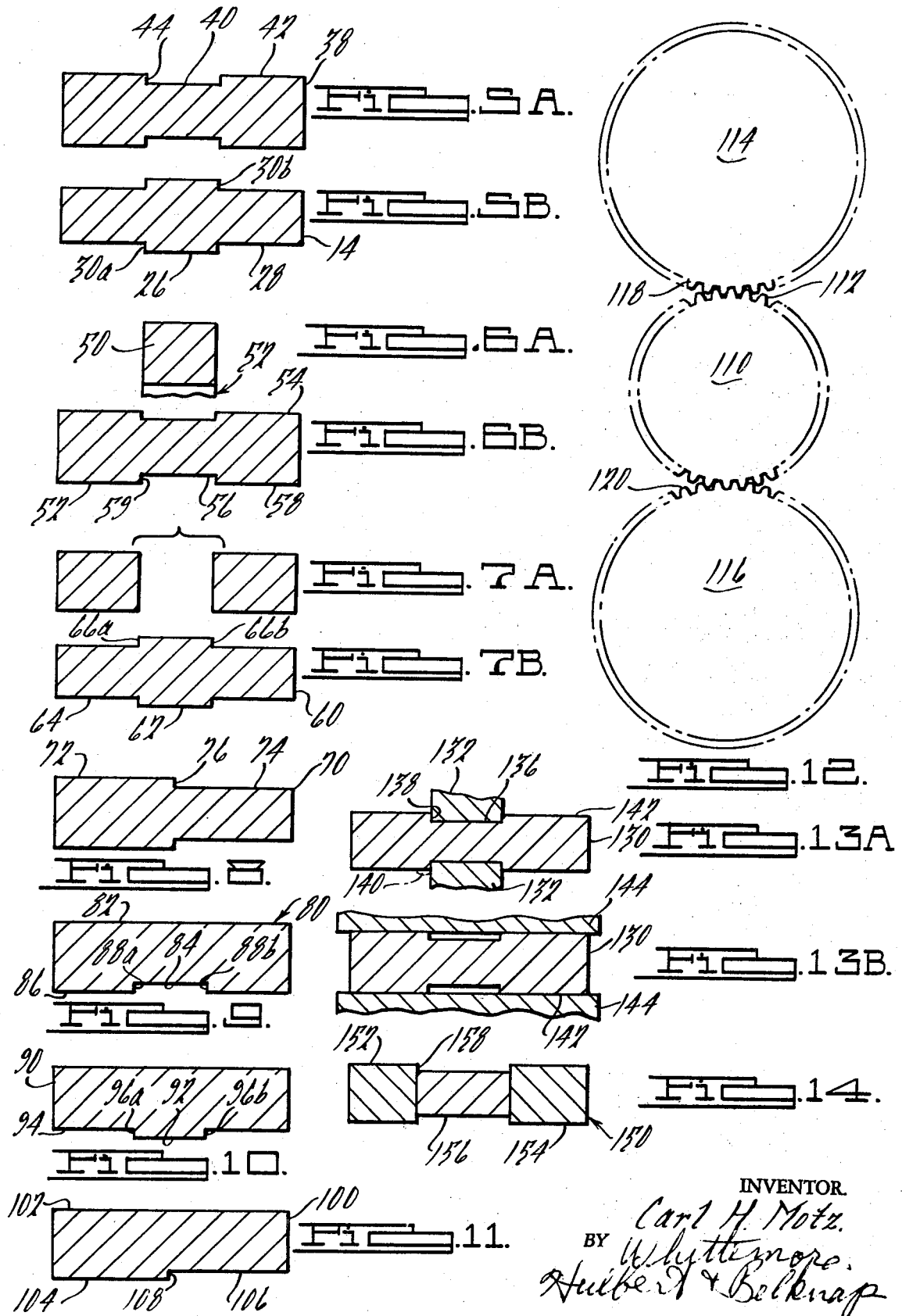

ROLLING OF GEAR LOCKS

BRIEF SUMMARY OF THE INVENTION

Gear lock constructions designed to prevent selectively engageable clutch gears from coming out of mesh with each other comprise shoulders formed intermediate the ends of the teeth of a clutch gear for engagement usually with the ends of teeth of a companion clutch gear. These clutch gears cooperate to prevent relative axial movement between the clutch gears which would permit them to come out of mesh.

The present method involves designing a hardened gear-like rolling die so that its teeth have areas corresponding to the areas of the clutch gear which are to be depressed or recessed.

The rolling die and the gear are rolled together in tight mesh and a relative infeed is provided which causes the areas on the teeth of the die to form correspondingly depressed or recessed areas in the sides of the gear teeth, with resultant formation of shoulders thereon extending generally between the roots and crests thereof.

BRIEF DESCRIPTION OF THE DRAWINGS

FIG. 1 is a fragmentary sectional view showing a clutch gear lock in operating position.

FIG. 2 is an enlarged fragmentary section on the line 2—2, FIG. 1.

FIG. 3 is a simplified elevational view showing a clutch gear and die during the rolling operation.

FIG. 4A is an enlarged perspective view of a tooth of the die seen in FIG. 3.

FIG. 4B is an enlarged perspective view of a finish-rolled tooth on the clutch gear seen in FIG. 3.

FIG. 5A is a sectional view through the tooth of the die shown in FIG. 4A.

FIG. 5B is a sectional view through the tooth of the clutch gear shown in FIG. 4B.

FIG. 6A is a sectional view through a tooth of a narrow die.

FIG. 6B is a sectional view through a tooth of a clutch gear formed by a die having the tooth shown in FIG. 6A.

FIG. 7A is a sectional view through the teeth of two narrow juxtapositioned dies.

FIG. 7B is a sectional view through a tooth of the clutch gear produced by the dies shown in FIG. 7A.

FIGS. 8–11 are sectional views through clutch gear teeth of different designs.

FIG. 12 is a diagrammatic view showing a clutch gear being rolled by a pair of opposed dies.

FIG. 13A is a sectional view through a clutch gear tooth and the teeth of one of a pair of opposed rolling dies.

FIG. 13B is a sectional view of the clutch gear tooth shown in FIG. 13A, being acted on by teeth of the other of a pair of opposed dies.

FIG. 14 is a sectional view through a composite die.

DETAILED DESCRIPTION

Referring first to FIG. 1 there is illustrated the manner in which clutch gears are employed. In this Figure a shaft 10 has a gear 12 journaled thereon for free rotation. The shaft 10 is provided with a clutch gear 13 having teeth 14. This clutch gear may be integral with the shaft or formed separately and connected thereto. The gear 12 is provided with a toothed clutch portion having teeth 16.

Ordinarily, the shaft 10 is provided with a separate gear rotatably mounted thereon and a portion of such gear is indicated at 18.

Slidably mounted on the shaft 10 is a toothed clutch gear or ring 20 having an opening therethrough provided with internally extending clutch teeth 22. The ring 20 is provided with a peripheral groove 24 receiving the arms of a shifter fork which may move the ring axially from the position shown in FIG. 1 to a position in which its teeth 22 connect the teeth 14 provided on the clutch gear 13 with teeth (not shown) on the additional gear 18 rotatable on the shaft 10. It will of course be apparent that with the clutch ring 20 in the position illustrated in FIG. 1, rotation of the shaft is transmitted through the clutch mechanism to the gear 12. When the clutch ring is shifted to the right, as seen in FIG. 1, it serves to connect the shaft 10 to the gear 18.

In order to insure that when the clutch ring has been shifted to either of its operative positions it will not inadvertently become restored to the intermediate position in which both gears are free to rotate, gear lock structure is provided on the teeth. Such gear lock structure is illustrated in FIG. 2 where the teeth 14 provided on the clutch gear 13 have an intermediate raised portion 26 and relatively depressed or reduced portions 28 adjacent the ends of the teeth 14. The arrangement is such that gear lock shoulders 30a and 30b are provided at opposite ends of the elevated tooth areas 26. The shoulders 30a and 30b extend generally in the plane of rotation, or between the roots and crests of the teeth 14.

In FIG. 2 the adjacent ends of the gear teeth 16 are illustrated and cooperating portions of the teeth 22 of the ring 20. It will be observed that the ends of the teeth 22 engage shoulders 30a on the clutch teeth 14 and will serve to prevent inadvertent shifting movement of the ring 20 from the position illustrated in FIG. 2. In this Figure it is assumed that the shaft 10 is rotating in such a direction as to cause the teeth 14 to rotate the ring 20 in the direction indicated by the arrow 32 and accordingly, the illustrated tooth surfaces contact as seen in FIG. 2. The clearance provided is exaggerated. However, it is apparent that sufficient clearance between the teeth 22 of the clutch ring 20 must be provided to permit the clutch ring to pass completely over the intermediate relatively wide portion of the teeth 14 in order to disengage the gear 12 from the shaft, to then leave both gears 12 and 18 free for rotation, and upon further movement to connect the gear 18 to be driven by the shaft 10.

Referring now to FIG. 3 there is diagrammatically illustrated an arrangement in which a die 36 having teeth 38 is rolled in mesh with a clutch gear 13 having teeth 14. The gear rolling operation is carried out by driving the die 36 or the gear 13 in rotation while it is in mesh with the companion member, and effecting a relative depth feed to modify the teeth of the clutch gear as illustrated generally in FIG. 2. In this operation, metal is caused to undergo plastic flow on the teeth of the clutch gear and accordingly, relatively massive forces are required.

Referring now to FIGS. 4A and 4B there is illustrated in greatly enlarged shape a tooth 38 of the die and the teeth 14 of the clutch gear 13 whose surfaces are modified by the rolling operation.

The tooth 38 of the die is provided with an intermediate recessed or reduced portion 40 intermediate two relatively elevated end portions 42. The surface portions 40 and 42 are of tooth form such for example as involute, and intermediate the surfaces 40 and 42 are oppositely and inwardly facing shoulders 44. The clutch tooth 14 rolls under relatively great pressure in contact with the teeth 38 and its surfaces are formed as illustrated in FIG. 4B to have the intermediate elevated portion 26 and the reduced end portions 28, these portions being separated by the oppositely facing shoulders 30a and 30b. In the rolling operation pressure is continued until the surfaces 28 on the clutch teeth are sufficiently reduced to cause the surface of the raised intermediate portion 26 of the clutch teeth to contact the surfaces of the reduced intermediate portions 40 of the die teeth. During initial rolling metal may undergo plastic flow from the end portions 28 of the gear teeth and form raised areas at the ends of the intermediate raised portion 26 of the die teeth. However, upon completion of the operation, the clutch teeth will be formed as illustrated and the entire surface of the intermediate raised areas will be smoothed out.

While the shoulders 30a are illustrated as generally radial surfaces intersecting the areas 26 and 28 in sharp corners, this illustration is idealized and in fact, the shoulders may have fillets at these corners. It is only essential that the shoulders be sufficiently defined to provide abutments engageable by the ends or other appropriate portions of the teeth of the clutch ring.

Referring now to FIGS. 5A and 5B there is illustrated in appropriate juxtaposition the teeth 38 of the die 36 and the teeth 14 of the clutch ring. Reference characters as previously applied in FIGS. 1-4B are applied to FIGS. 5A and 5B.

In the foregoing operation the axes of the die and clutch gear are parallel during the rolling operation, or substantially parallel. A minor deviation from true parallelism is acceptable and in some cases may be desirable.

Referring now to FIGS. 6A and 6B there is illustrated a tooth 50 of a relatively narrow die 52 which is adapted to be rolled in pressure contact with a clutch gear having teeth 54. Due to the narrow width of the die, the rolling operation produces a recessed or depressed area 56 centrally of the teeth 54 of the clutch gear, leaving the end portions 57 and 58 relatively elevated and forming shoulders 59 thereon. In this case the clutch ring will have tooth portions adapted to engage the recessed tooth portions 56 of the clutch gear, and the shoulders 59 will prevent accidental displacement from clutching position.

Referring now to FIGS. 7A and 7B an arrangement is shown in which the teeth 60 of the clutch gear may be provided with the relatively elevated central areas 62 and the relatively depressed end areas 64, leaving outwardly facing gear locking shoulders 66a and 66b, all similar to the arrangement illustrated in FIGS. 1-4. In this case however, the surface of the raised areas 62 of the clutch teeth are not rolled.

Referring now to FIG. 8 there is illustrated a clutch gear tooth 70 having a relatively elevated area 72 at one end and a relatively depressed area 74 at the opposite end, with a shoulder 76 intermediate the areas 72 and 74. This arrangement is feasible since disengagement between the teeth of a clutch gear and the teeth of the associated clutch ring normally takes place only in one direction.

In FIG. 9 there is illustrated one tooth 80 of a clutch gear, the teeth of which at one side are smooth from end to end as indicated at 82. On the opposite side the intermediate portion of the teeth is depressed as indicated at 84 leaving the relatively elevated are as 86 forming the shoulders 88a and 88b. This arrangement is practical in situations in which clutched engagement of the gear to the shaft is required to transmit rotation in one direction only.

Referring now to FIG. 10 there is illustrated an arrangement similar to FIG. 9 in which case the clutch gear teeth 90 are provided with central relatively elevated areas 92 and relatively depressed areas 94 adjacent the ends, leaving the shoulders 96a and 96b as illustrated.

Referring now to FIG. 11 there is illustrated a tooth 100 of a clutch gear having one side 102 thereof smooth and the opposite side provided with the relatively elevated area 104 and the relatively depressed area 106, leaving the shoulder 108 therebetween. Again, this construction is feasible in clutch arrangements intended for clutched rotation in only one direction.

It may be mentioned at this time that the diagrammatic showings made so far may be substantially modified by increasing the width of the areas adapted to transmit torque and reducing the areas whose function is primarily the provision of the shoulders which effect the gear locking operation. The forces tending to disengage clutch elements by relative axial movement are of course relatively small and the toothed portions whose function is to provide the gear lock shoulders may be quite narrow.

Referring now to FIG. 12 there is illustrated an arrangement in which a clutch gear 110 having teeth 112 is rolled between a pair of diametrically opposed dies 114 and 116, the teeth of which are respectively indicated at 118 and 120. In this case the teeth of the dies may be identical and may produce the symmetrical clutch teeth formations illustrated in FIGS. 5B, 6B, 7B and 8. Alternatively however, the employment of opposed rolls may be used to provide lock formations at one side only of the teeth of the clutch gear such for example as illustrated in FIGS. 9, 10 and 11. In this case one of the dies, as for example the upper die 114 having teeth 118 as best illustrated in FIG. 12, may have the tooth surfaces of its teeth 118 perfectly smooth. On the other hand, the teeth of the tooth die 116 may have its teeth 120 provided with one smooth side and the other side provided with a tooth formation designed to produce the gear lock structure. It will be appreciated that the teeth 120 of the die may produce the tooth formation illustrated in FIG. 9 in which the clutch teeth have the relatively depressed or reduced area 84 centrally thereof and the relatively elevated end areas 86.

The application of deforming pressure to a limited area on the flanks of the teeth of a die depresses the area to which pressure is applied, but also causes flow of material at the edges of the area. As previously described, this condition is corrected or substantially corrected if the die teeth have the areas adjacent those designed to apply deforming pressure, disposed so as to contact the surfaces of the clutch gear teeth upon completion of the rolling operation. This however, permits formation of displaced material at the sides of the depressed area to appreciable height followed by the rolling operation which reduces the height of the displaced material.

Referring now to FIGS. 13A and 13B there is illustrated a procedure which prevents the formation of the displaced material. In FIG. 13A there is shown a tooth 130 of a clutch gear in mesh simultaneously with the teeth 132 of a first narrow die which is one of a pair of opposed dies, designed to form depressed areas 136 on the clutch gear teeth so as to provide the locking shoulders 138 thereon. If the single die having the teeth 132 operated on the clutch gear alone, material would be displaced into elevated zones as indicated in dotted lines at 140, and while this displaced material could be formed back into the tooth profile surface 142 by appropriate modification of the die having the teeth 132, it is possible to substantially prevent formation of the elevated areas 140 by the procedure which will now be described.

Referring to FIG. 13B there is illustrated the tooth 130 in tight mesh with teeth 144 of a second die operating in opposed relation to the die having the teeth 132. The teeth 144 are smooth from end to end and are accordingly always in tight pressure contact with the other flank surfaces 142 so that as the material is displaced by the teeth 132 and starts to form the elevated areas 140, these areas are displaced back into the tooth profile 142 as the teeth pass through meshing engagement with the second die having the opposed teeth 144.

Referring now to FIG. 14 there is illustrated a die having teeth 150 of substantially the same configuration as that shown in FIG. 1. In this case however, the die is a composite die made up of relatively narrow gearform members having teeth 152, 154 and 156. It will be observed that the members having the teeth 152 and 154 constitute the outer elements of a composite die structure and that the teeth 152 and 154 are relatively thicker than the teeth 156.

Accordingly, when the parts are assembled together, shoulders as indicated at 158 are present corresponding to the shoulders 41 seen in FIG. 1. The gear-like members having the teeth 152, 154 and 156 may be permanently interconnected as by welding, brazing, or the like, or they may be merely clamped together by suitable releasable clamping means.

What I claim as my invention is:

1. The method of forming the teeth of a clutch gear to have depressed areas thereon adjacent relatively elevated areas defining gear lock shoulders which substantially occupy a single plane of rotation of the clutch gear perpendicular to its axis, which comprises meshing the gear in tight mesh with a die having teeth provided with predetermined areas corresponding to the areas to be depressed on the clutch gear teeth, said die tooth areas having abrupt boundaries occupying a single plane perpendicular to the axis of the die, relatively positioning said die and gear such that the last mentioned plane of rotation is located intermediate the ends of the clutch gear teeth, rotating the die and gear in mesh on substantially parallel axes, and effecting a relative depth feed to cause the predetermined areas of the die teeth to displace material on the gear teeth to form depressed areas thereon adjacent relatively elevated areas having gear locking shoulders occupying a single plane perpendicular to the axis of the gear between the relatively elevated and depressed areas.

2. The method as defined in claim 1 in which the die teeth have areas adjacent the predetermined areas which are relatively depressed and are conjugate to the clutch gear teeth and which comprises rolling the gear tooth surfaces which are not depressed to a smooth finished form by engagement with relatively depressed areas of the die teeth.

3. The method as defined in claim 1 in which the predetermined areas of the teeth of the die are of uniform elevation throughout, and which comprises rolling the depressed areas of the clutch gear teeth to a smooth finished form.

4. The method as defined in claim 1 in which the predetermined areas on the teeth of the die are spaced inwardly from the ends thereof, and which comprises depressing corresponding areas spaced inwardly from the ends of the clutch gear teeth and simultaneously forming at opposite ends of each depressed area on the clutch gear abrupt inwardly facing shoulders.

5. The method as defined in claim 1 which comprises rolling the die and gear on axes which are parallel to each other.

6. The method of forming the teeth of a clutch gear to have depressed areas thereon presenting gear lock shoulders which occupy a single plane of rotation of the clutch gear perpendicular to its axis, which comprises meshing the clutch gear in tight mesh with a die having teeth having gear lock forming portions extending from crest to root thereof and limited end-wise of the teeth by abrupt generally radially extending surfaces which occupy a single plane of rotation in position such that said last mentioned plane of rotation is intermediate the ends of the clutch gear teeth, rotating the die and clutch gear in mesh, and effecting a relative depth feed therebetween to depress a zone on all of the teeth of the clutch gear relative to the original surface thereof and to form generally relatively abrupt shoulders on the clutch gear teeth which occupy a single plane of rotation.

7. The method as defined in claim 6 in which the gear lock forming portions of the die teeth are elevated portions extending above remaining portions at each end thereof.

8. The method as defined in claim 6 in which the die has smooth surfaced teeth and one side of the die occupies a plane located between the ends of the gear teeth.

9. The method as defined in claim 6 in which the die has smooth surfaced teeth and both sides of the die occupy planes located between the ends of the gear teeth.

10. The method of forming the teeth of a clutch gear to have depressed areas thereon presenting gear lock shoulders which occupy a single plane of rotation on the clutch gear perpendicular to its axis, which comprises meshing the clutch gear in tight mesh with a pair of opposed dies, one of the dies being a forming die having teeth provided with limited areas adapted to form corresponding depressed areas in the teeth of the clutch gear, the other die having smooth teeth at least in the areas engaging the edge boundaries of the depressed areas of the clutch gear, rolling the opposed dies and gear in mesh and providing relative feed between the gear and the dies radially inwardly of the gear to depress areas of the gear teeth and to prevent the formation of localized elevated areas adjacent the edges of the depressed areas on the gear teeth by rolling contact with the teeth of the said other die.

11. A die for rolling clutch gear lock formations into the flanks of the teeth of a clutch gear, said die being formed of a plurality of separate gear-like elements rigidly interconnected together to form a composite die, the teeth of one of the elements being thicker than the teeth of the other element, the ends of the teeth of the elements being perpendicular to the axes thereof and being in surface to surface contact to provide shoulders intermediate the ends of the teeth of the composite die which occupy a plane perpendicular to the axis thereof.

* * * * *